Figure 1:
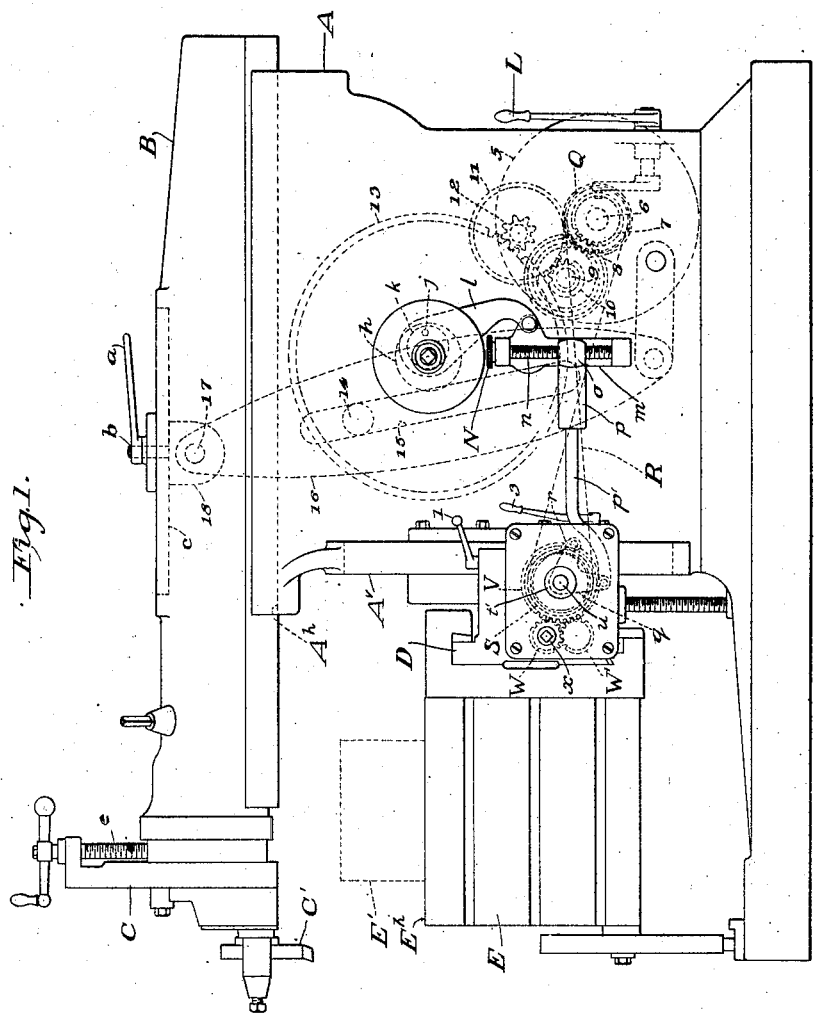

Jan. 18, 1927.

W. F. ZIMMERMANN 1,615,185

MANUFACTURING QUICK TRAVERSE SHAPER

Filed Feb. 9, 1926      3 Sheets-Sheet 1

Inventor
William F. Zimmermann
By Attorney
Albert F. Nathan

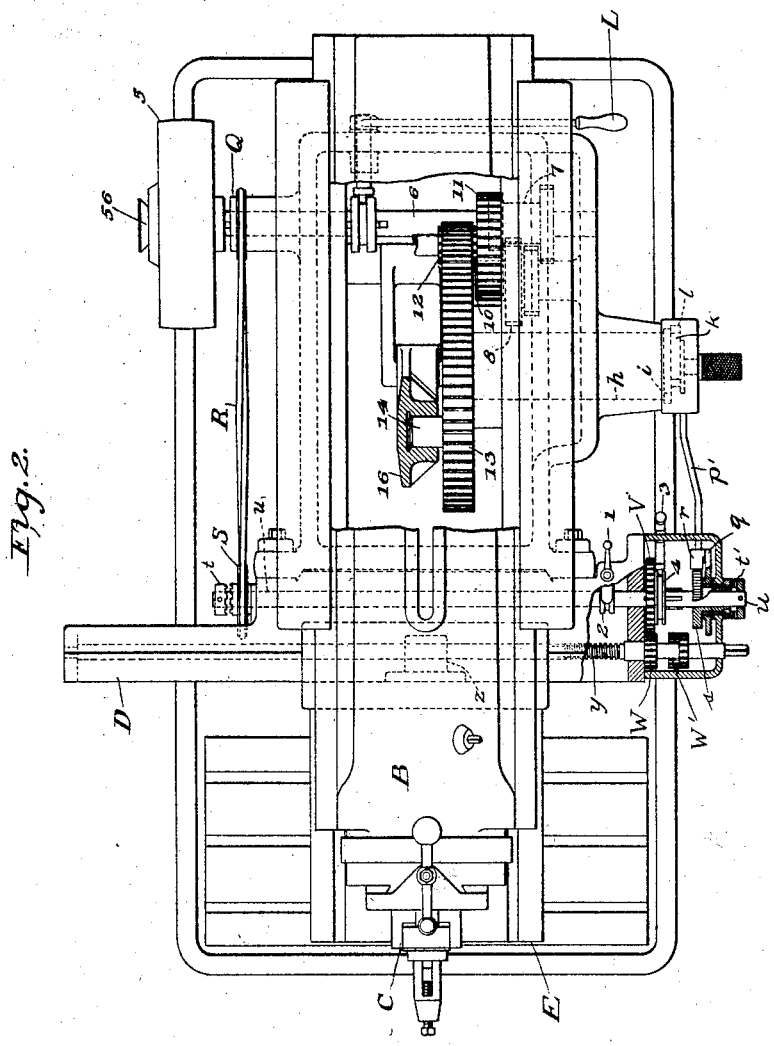

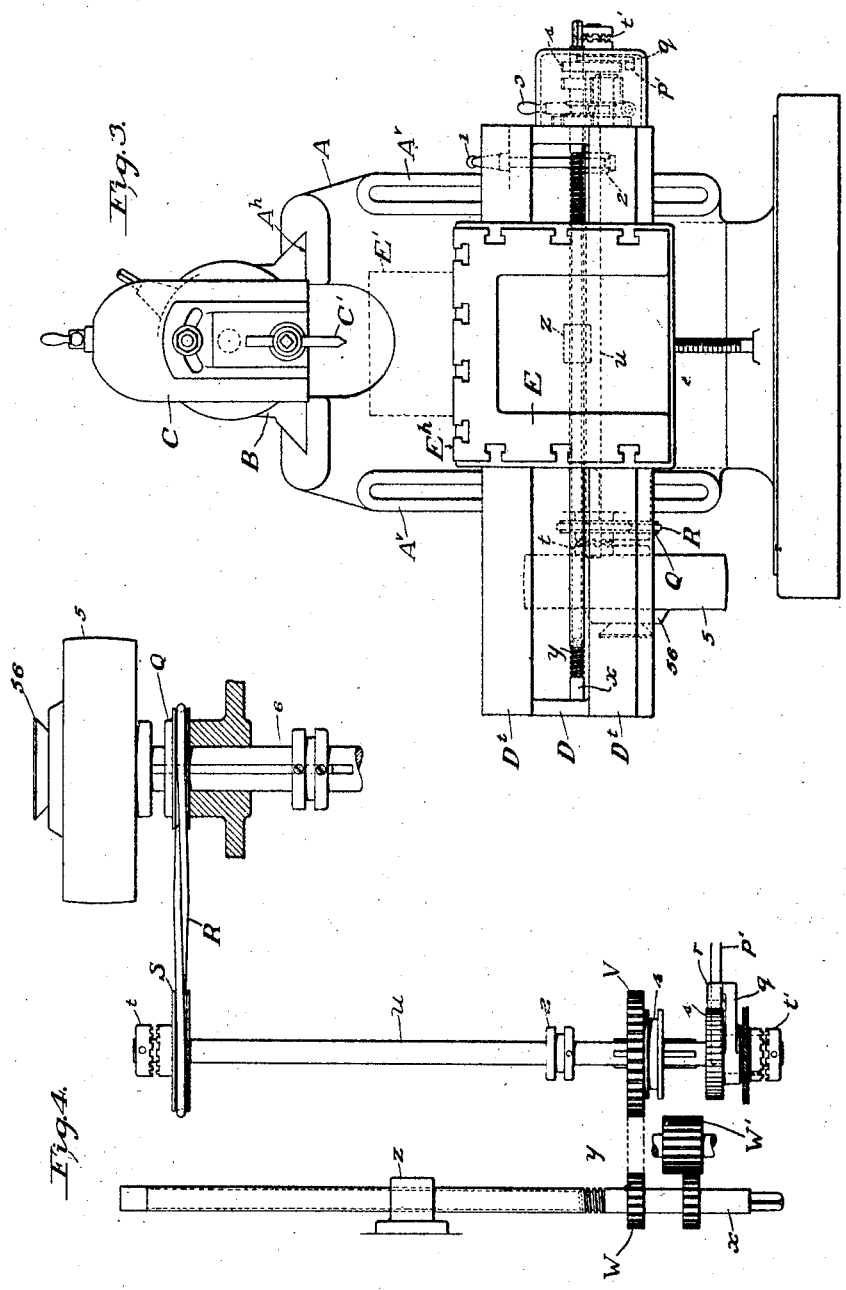

Patented Jan. 18, 1927.

1,615,185

UNITED STATES PATENT OFFICE.

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY.

MANUFACTURING QUICK-TRAVERSE SHAPER.

Application filed February 9, 1926. Serial No. 87,063.

All classes and sorts of machines utilizing power for tooling metal are commonly referred to under the miscellaneous title of "machine-tools" and this invention is devoted to a new development in a characteristic class identified in a distinctive sense by the term "shaper." Those shapers, as a class, have remained what may be called tool-room machines and this invention seeks to develop a species that may appropriately become known as a manufacturing type by reason of being suitable for quantity production where the time consumed in successively replacing the work-blanks must be reduced to a minimum.

A so-called "shaper" differs in various essential principles from other types of machine-tools and its development into a manufacturing type of shaper accordingly presents new problems from an improver's standpoint. For example, in a miller, the tool and the work both move during the cutting stroke, while in a planer the work alone moves to perform each cutting stroke and the tool is stationary. But in a shaper, the cutting stroke is performed by holding the work stationary and horizontally advancing the tool in a path parallel with the surface of the work-support. In the miller, the "feed" is a complex and it consists in a uniform progression of both the work (a translation) and the tool (a rotation) during and throughout the cutting operation. In a planer, the "feed" is accomplished in a still different way, i. e. by progressively side-shifting the tool, and the tool is held stationary and the work is advanced to accomplish the cutting strokes. In the shaper, however, there is no movement of the work during any cutting stroke and the "feed" is an intermittent side-shift of the work to an extent sufficient to provide the desired width of cut for each stroke of the tool.

To economize time, milling-machines now provide means for accelerating the travel of the work; but habitually in the same path or line in which it advances during the cutting operation. This is the so-called "quick-traverse" and some analogy is perhaps found in the periodic quick-return of the work in a planer along the identical path of its advance against the stationary tool during the cutting operation. But in no shaper is there any power quick-traverse for the work; the only rapid power movement being in the nature of a quick-return of the tool-carrying ram along the identical path of its cutting stroke. This periodic tool-return, however, had nothing to do with facilitating work-replacement for in the shaper the table was progressively advanced after each cutting stroke until the work-blank had been completely machined; whereupon it always had to be manually brought to an initial feeding position before a new blank could be inserted and there was no means for accomplishing this occasional blank-replacing shift of the table either rapidly or by power.

The previous user of a shaper was thus obliged to expend both time and manual effort in screwing back the table preparatory to re-starting the machine for removing the next layer of the work (where two or more successive depths of cut had to be taken) or for bringing the table into position to receive a new piece of work. This labor and undue loss of time, while not so material in the tool-room, became a consequential item of expense in the shop and, oftentimes, a prohibition against the use of a shaper for quantity production. Towards creating a truly "manufacturing shaper", it is now proposed to incorporate improvements, involving a reorganization of the transmission system, whereby such movements may be performed by power instead of by hand, and at a rate much quicker than manually, and through a facile control for very readily substituting the power quick-traverse for the regular slow feed of the table; all to the end of opening up new fields of commercial usefulness for shapers.

Simplicity being vital to sturdiness, it is the aim so to embody the power-mechanism for rapidly traversing the table that the secondary transmission elements, extending from the main-line transmission to the cross-rail and thence to the table, will have the ultimate dual function of propelling the table either with a slow intermittent or with a fast continuous movement. In making this reorganization, it is proposed to incorporate, at a suitable station, a compact conversion mechanism combined with a manual shift whereby the power may be optionally transformed from a step-by-step feed to a rapid-traverse; thereby augmenting the capacities of machine without materially increasing its number of elements.

This will become manifest by reference to the drawings in which Fig. 1 represents a side-elevation; Fig. 2 a plan view partly in section; Fig. 3 a front elevation; and Fig. 4 a development of an illustrative embodiment of the invention.

The ultimate power-line or auxiliary transmission for propelling the table transversely to the horizontally-acting ram is, in this instance, represented as a shaft $x$ journaled in the cross-rail D and having threads $y$ engaging a nut $z$ affixed to the table E for propelling it as stated. This ultimate transmission $x\ y\ z$ derives its motion from the main-line through transmission elements constituting direction reversing means, shift means, a fast-running branch-line transmission and an intermittent motion transmission.

The fast-running branch is here instanced as comprising a pulley Q affixed to one of the elements (the shaft 6) of the main-line so as to be driven by the power whenever the machine is running. The terminal element of this quick-traverse transmission may be regarded as the pulley S and the intervening portion of this transmission is here represented in elemental form as a belt R which is here shown as crossed to turn the pulley S in the same direction as the ratchet wheel $s$ for the feed.

The shift mechanism here takes the form of a shaft $u$ appropriately journaled, in this example in the cross-rail, and this shaft is driven by clutch means which enable it to be connected with either the fast or the slow transmission. This is done in an appropriate manner as, for example, by a clutch $t$ at one end and a clutch $t'$ at its other; the latter being adapted to engage the terminal element $s$ of the slow motion transmission. A simple mode of accomplishing the one engagement or the other is to shift the shaft axially by actuating a shift control lever 1 which operates a spool 2 on said shaft. Thus, by shifting the shaft $u$ in one direction, the clutch $t$ will engage the pulley S and the shaft will transmit motion used for the rapid traverse of the table.

This shift mechanism is preferably in serial relation with a motion-reverser which may be regarded as a gear V shiftable to engage either the direct-drive gear W or the intermediate reverse-drive gear W'; each of these gears being, when thus engaged, elements for transmitting the quick-traverse or the slow feed motion to the screw shaft $x$. The shifting of the direction-changing gear V is done by a hand lever 3 controlling the spool 4.

A tool-head C is so mounted on the overhanging extremity of the ram B as to admit of being bodily moved (as by means of a screw $e$) in a direction at right-angles to the stroke-path of the ram; thereby enabling the tool C' to be adjusted towards the work-piece E' on the underlying table E to cause the tool to remove a predetermined depth of cut at each of its reciprocations until a horizontal layer of given depth has been taken off the work. An important and essential relation of this invention is that the bodily advance of the tool in all of its cutting strokes is confined to a narrow path parallel with said layer and that, likewise, both the intermittent feed and the power quick-traverse operate parallel with said layer but always confined to a direction at right-angles to said path. This will now be made more manifest by outlining certain structural characteristics.

The body-casting A has a vertical slide-way $A^v$ on its front face and a horizontal slide-way $A^h$ on its top face; these two slideways being in the same general vertical plane so that they converge towards the upper front edge of the main frame. The cross rail D is adjustable along the vertical slide-way but is elongated transversely thereto and this cross-rail always underlies the ram B which continuously reciprocates in parallelism with the horizontal work-supporting surface $E^h$ of a table E which slides, however, along horizontal ways $D^t$ extending longitudinally with the cross rail D and hence at right-angles with the overlying horizontal path of the reciprocating cutting-tool.

The main-line transmission is located within the body-casting A, and comprises the train of elements 5, 6, 7, 8, 9, 10, 11, 12, 13, 14, 15, 16, 17 and 18 which, being conventional, may be briefly described. The prime-mover or main-pulley 5 acts through a clutch 56 controlled by lever L to drive the shaft 6; the motion of which flows through change gears 7 and 8 and thus drives the shaft 9 and pinion 10. The latter drives the gear 11 which in turn drives a pinion 12 meshing with the bull-gear 13. A pivot 14 (adjustable radially on the bull-gear) rides in a slot 15 of the master-lever 16 which, at its upper end, operates a pin 17 for reciprocating the ram B through an adjustable block 18. By means of the hand lever $a$ and the screw $b$, that block may be clamped against the shoulder $c$ of the ram to regulate the extent of over-hang of the ram required by the particular work to be machined. The mechanism thus provides adjustments for varying (1) the frequency of the strokes of the ram, (2) the length of the stroke and (3) the over-hang of the ram, and since the quick-traverse motion is derived from a point on the main line between the master-clutch and the change-gears for the bull-gear, the quick-traverse has a constant rate and is always available so long as the master-clutch has set the machine in operation.

The slow-motion transmission is here represented as a train of elements, $h, i, j, k, l, m, n, o, p, q, r, s$, which derives power from an appropriate element of the main-line transmission within the body-casting; the junction element being here taken as the hub $h$ of the bull-gear 13. On the end of the hub is a plate $i$ which, through a suitable connection $j$ revolves an eccentric $k$ for oscillating a link $l$ whereby a rocker $m$ pivoted to the body-casting will be oscillated regularly. This rocker has a radial guide in the form of a screw $n$ whereby a pivot $o$ may be set at adjustable distances from the axis of the rocker. This adjustment is made by manually turning the knurled knob N which operates the screws $n$ to vary the length of the arc of swing of the aforesaid pivot $o$ and hence the length of each stroke of the intermittent-motion extensible link composed of the two connected parts $p$ and $p'$. This link in turn oscillates a rocker $q$ pivoted loosely about the shaft $u$ in the cross-rail. This rocker vibrates a pawl $r$ through an arc the length of which, of course, is determined by the stroke of the extensible link; and this pawl in turn intermittently advances the ratchet wheel $s$ so that, when the latter is engaged by the clutch $t'$, the intermittent slow feed will be transmitted to the table as previously explained.

By tracing the flow of motion from the main-line transmission to the junction element (the shaft $u$) of the quick-traverse and the slow feed branch-line transmissions, it will be seen that the direction of propulsion of the table will be unchanged by shifting the rate control lever 1, and likewise the rate of propulsion will be unchanged by operating the direction control lever 3. These levers therefore afford a manual control whereby the table may be slowly fed and quickly-traversed in the same direction or may be quickly-traversed in a direction contrary to that of the feed; depending upon the manner of manipulating the control means.

Having thus revealed this invention, I claim as new and desire to secure the following combinations and elements, or equivalents thereof, by Letters Patent of the United States:—

A quick-traverse heavy-duty shaper for production manufacturing, combining a body-casting having a vertical front slide-way and a horizontal top-slide; a transverse cross-rail vertically adjustable; a table slidable on said cross rail transversely to said vertical slide-way and having a horizontal work-supporting surface; an auxiliary table-propelling transmission; a horizontal ram overhanging said table; a main-line transmission leading to said ram for periodically reciprocating it in said top-slide slowly to and rapidly fro along a fixed path parallel with but above said work-supporting surface; a tool-head on the overhanging extremity of said ram and adjustable in a plane perpendicular to the path of said ram to determine the depth of cut of its tool; a fast-running branch-line transmission and an intermittent motion transmission, each deriving motion from said main-line transmission; shift mechanism combined with said last-mentioned transmissions for enabling either at option to drive said auxiliary transmission for feeding said table step-by-step along said cross-rail transversely to said path to project successive horizontal strips of the work thereon into the horizontal path of the tool carried by said ram, or for quickly traversing said table along said cross-rail transversely to said path; and a manual control for said shift mechanism for causing either the intermittent or the quick-traverse means to propel said table by power.

In witness whereof, I have hereunto subscribed my name.

WILLIAM F. ZIMMERMANN.